(12) United States Patent
Naskar et al.

(10) Patent No.: US 9,725,829 B2
(45) Date of Patent: Aug. 8, 2017

(54) MAGNETO-CARBONIZATION METHOD FOR PRODUCTION OF CARBON FIBER, AND HIGH PERFORMANCE CARBON FIBERS MADE THEREBY

(71) Applicant: UT-Battelle, LLC, Oak Ridge, TN (US)

(72) Inventors: Amit K. Naskar, Knoxville, TN (US); Soydan Ozcan, Oak Ridge, TN (US); Claude C. Eberle, Knoxville, TN (US); Mohamed Gabr Abdallah, Salt Lake City, UT (US); Gail Mackiewicz Ludtka, Oak Ridge, TN (US); Gerard Michael Ludtka, Oak Ridge, TN (US); Felix Leonard Paulauskas, Knoxville, TN (US); John Daniel Kennedy Rivard, Washington, DC (US)

(73) Assignee: UT-BATTELLE, LLC, Oak Ridge, TN (US)

(*) Notice: Subject to any disclaimer, the term of this patent is extended or adjusted under 35 U.S.C. 154(b) by 818 days.

(21) Appl. No.: 13/833,834

(22) Filed: Mar. 15, 2013

(65) Prior Publication Data
US 2014/0265038 A1 Sep. 18, 2014

(51) Int. Cl.
*D01F 9/12* (2006.01)
*D01F 9/22* (2006.01)
(Continued)

(52) U.S. Cl.
CPC .............. *D01F 9/225* (2013.01); *D01F 9/14* (2013.01); *B29C 47/0014* (2013.01);
(Continued)

(58) Field of Classification Search
CPC ... D01F 9/12; D01F 9/127; D01F 9/14; D01F 9/225; D01F 9/145; C01B 31/02;
(Continued)

(56) References Cited

U.S. PATENT DOCUMENTS

| 4,020,145 A | 4/1977 | Soehngen et al. | |
| 4,197,282 A * | 4/1980 | Bailly-Lacresse | D01F 9/145 264/29.2 |

(Continued)

FOREIGN PATENT DOCUMENTS

| JP | 49-54630 | * 5/1974 | D01F 9/22 |
| JP | 11081052 A | * 3/1999 | D01F 9/22 |

(Continued)

OTHER PUBLICATIONS

English Abstract for Japenese publication 49-54630, published on May 28, 1974.*

(Continued)

*Primary Examiner* — Seyed Masoud Malekzadeh
(74) *Attorney, Agent, or Firm* — Scully Scott Murphy & Presser

(57) ABSTRACT

Method for the preparation of carbon fiber from fiber precursor, wherein the fiber precursor is subjected to a magnetic field of at least 3 Tesla during a carbonization process. The carbonization process is generally conducted at a temperature of at least 400° C. and less than 2200° C., wherein, in particular embodiments, the carbonization process includes a low temperature carbonization step conducted at a temperature of at least or above 400° C. or 500° C. and less than or up to 1000° C., 1100° C., or 1200° C., followed by a high temperature carbonization step conducted at a temperature of at least or above 1200° C. In particular embodiments, particularly in the case of a polyacrylonitrile (PAN) fiber precursor, the resulting carbon fiber may possess a minimum tensile strength of at least 600 ksi, a tensile modulus of at least 30 Msi, and an ultimate elongation of at least 1.5%.

27 Claims, 13 Drawing Sheets

(51) Int. Cl.
*D01F 9/14* (2006.01)
*C01B 31/02* (2006.01)
*D01F 9/145* (2006.01)
*D01F 9/127* (2006.01)
*B29C 47/00* (2006.01)

(52) U.S. Cl.
CPC ............ *C01B 31/02* (2013.01); *C01B 31/022* (2013.01); *C01B 31/024* (2013.01); *C01B 31/0226* (2013.01); *D01F 9/12* (2013.01); *D01F 9/127* (2013.01); *D01F 9/145* (2013.01)

(58) Field of Classification Search
CPC . C01B 31/022; C01B 31/0226; C01B 31/024; B29C 47/0014
USPC ........... 264/29.1, 29.2, 29.5, 29.7, 405, 427; 423/447.1, 447.2, 447.3, 447.4, 447.9; 204/155
See application file for complete search history.

(56) References Cited

U.S. PATENT DOCUMENTS

| | | | | |
|---|---|---|---|---|
| 4,321,446 | A * | 3/1982 | Ogawa ................... | C01B 31/02 219/618 |
| 6,372,192 | B1 | 4/2002 | Paulauskas et al. | |
| 6,375,875 | B1 | 4/2002 | Paulauskas et al. | |
| 6,652,958 | B2 * | 11/2003 | Tobita ........................ | 428/298.1 |
| 7,534,854 | B1 | 5/2009 | Paulauskas et al. | |
| 7,649,078 | B1 | 1/2010 | Paulauskas et al. | |
| 7,786,253 | B2 | 8/2010 | Paulauskas et al. | |
| 7,824,495 | B1 | 11/2010 | White et al. | |
| 7,927,575 | B2 * | 4/2011 | Ko ......................... | D03D 15/00 156/89.26 |
| 2005/0124246 | A1 * | 6/2005 | Ko ......................... | D03D 15/00 442/202 |
| 2006/0054491 | A1 * | 3/2006 | Hiraoka ................ | B82Y 10/00 204/175 |
| 2007/0228339 | A1 * | 10/2007 | Fujiwara et al. ............. | 252/511 |
| 2008/0152574 | A1 * | 6/2008 | Tanaka et al. ............. | 423/447.2 |
| 2008/0242772 | A1 * | 10/2008 | Nakamura et al. ............. | 524/70 |
| 2011/0104489 | A1 * | 5/2011 | Wolki ................ | B01D 67/0067 428/367 |
| 2012/0137446 | A1 * | 6/2012 | Wohlmann .............. | D01F 9/225 8/115.52 |

FOREIGN PATENT DOCUMENTS

| | | | | |
|---|---|---|---|---|
| JP | 2000345436 | A | * 12/2000 | ............... D01F 9/22 |
| RU | 2212479 | C2 | * 9/2003 | ............... D01F 9/12 |

OTHER PUBLICATIONS

English Abstract for RU 2212479: Fridman et al., "Method of Manufacturing Carbon-Fiber Adsorbent", published on Sep. 20, 2003.*

English Translation for JP 2000-345436: Asai et al., "Production of Carbon Fiber ", published on Dec. 12, 2000.*

Chino Y. et al., "Processing and Mechanical Properties of a Porous Low Carbon Steel With a Controlled Porous Structure by Imposition of a Static Magnetic Field", Materials Science and Engineering A 417:281-286 (2006).

Druzhinina T. et al., "Strategies for Post-Synthesis Alignment and Immobilization of Carbon Nanotubes", Advanced Materials 23:953-970 (2011).

Little R.B. et al., "Magnetization for Low Temperature, Selective Diamond and Carbon Nanotube Formation: A Milestone in Carbon Physicochemical Condensation", Journal of Applied Physics 95(5):2702-2712 (Mar. 1, 2004).

Sung M.G. et al., "Application of a High Magnetic Field in the Carbonization Process to Increase the Strength of Carbon Fibers", Carbon 40:2013-2020 (2002).

Takahashi T. et al., "Polycarbonate Crystallization by Vapor-Grown Carbon Fiber With and Without Magnetic Field", Macromolecular Rapid Communications 24(13):763-767 (2003).

* cited by examiner

MAGNETO-CARBONIZATION METHOD FOR PRODUCTION OF CARBON FIBER, AND HIGH PERFORMANCE CARBON FIBERS MADE THEREBY

This invention was made with government support under Prime Contract No. DE-AC05-00OR22725 awarded by the U.S. Department of Energy. The government has certain rights in the invention.

FIELD OF THE INVENTION

The present invention relates, generally, to methods for producing carbon fiber, and more particularly, to carbonization processing conditions for converting a precursor fiber to carbon fiber.

BACKGROUND OF THE INVENTION

Carbon fibers currently dominate the market for advanced structural fibers because of their superior properties. FIG. 1 charts the tensile strength (ksi) vs. elastic modulus (Msi) for several carbon fibers and other materials known in the art. FIG. 2 shows the relation between fiber diameter and corresponding tensile strength of various commercial carbon fibers.

Generally, by methods of the art, attainment of a high degree of strength (e.g., 600 ksi or higher) sacrifices the modulus, and vice-versa. Moreover, although carbon fiber may be produced with a high degree of strength with an increased modulus, the ultimate elongation is generally unsatisfactory for many applications. Yet, high-strength carbon fiber having a high modulus (e.g., at least 30 Msi) along with high ultimate elongation (e.g., at least 1.5% and higher) would provide significant advantages particularly where both strength and elasticity are required, such as in high-strength cables and impact-resistant materials and fabric.

SUMMARY OF THE INVENTION

In the process described herein, a carbon fiber precursor is carbonized in the presence of a magnetic field of at least 3 Tesla to produce a carbon fiber with desired properties, such as high tensile strength, modulus, and elongation, as particularly desired for structural carbon fibers. Moreover, the methodology described herein advantageously provides a carbon fiber of very high resilience (i.e., not prone to break failure or brittleness) even when carbonized at temperatures that ordinarily result in a significantly weakened (i.e., brittle) carbon fiber using carbonization processes of the art. The magnetization aspect of the described method is believed to be instrumental in reducing or altogether eliminating the presence of defects, particularly microstructural cracks, that cause significant weakening of the carbon fiber. Without being bound by theory, the magnetization may function to induce a self-healing mechanism in the precursor fiber as it becomes carbonized. In particular, by the instantly described method, substantially resilient and defect-free carbon fiber can be produced even when carbonizing at temperatures well above those temperatures (e.g., 1400° C. and higher) known to induce significant weakening of the carbon fiber. Carbonization at such high temperatures while maintaining such resilience in the carbon fiber advantageously permits carbonization processing at temperatures not normally considered practical, yet carbonization at such higher temperatures can achieve a carbon fiber with a combination of superior properties, such as in strength, modulus, elongation, and conductivity.

In more specific embodiments, the method is practiced by subjecting a carbon fiber precursor to a magnetic field of at least 3 Tesla during a carbonization process. The carbonization process is generally conducted at a temperature of at least 400° C. and less than 2200° C. In particular embodiments, the carbonization process includes a low temperature carbonization step conducted at a temperature of at least or above 400° C. or 500° C. and less than or up to 1000° C., 1100° C., or 1200° C., followed by a high temperature carbonization step conducted at a temperature above 1200° C., 1300° C., 1400° C., 1500° C., 1600° C., 1700° C., 1800° C., 1900° C., or 2000° C. The magnetization can be provided in the low temperature step, high temperature step, or both. The resulting carbon fiber, particularly for the case of polyacrylonitrile (PAN) precursor fiber, may possess a minimum tensile strength of at least 600 ksi, a tensile modulus of at least 30 Msi, and an ultimate elongation of at least 1.5%.

DETAILED DESCRIPTION OF THE INVENTION

Figure 1:
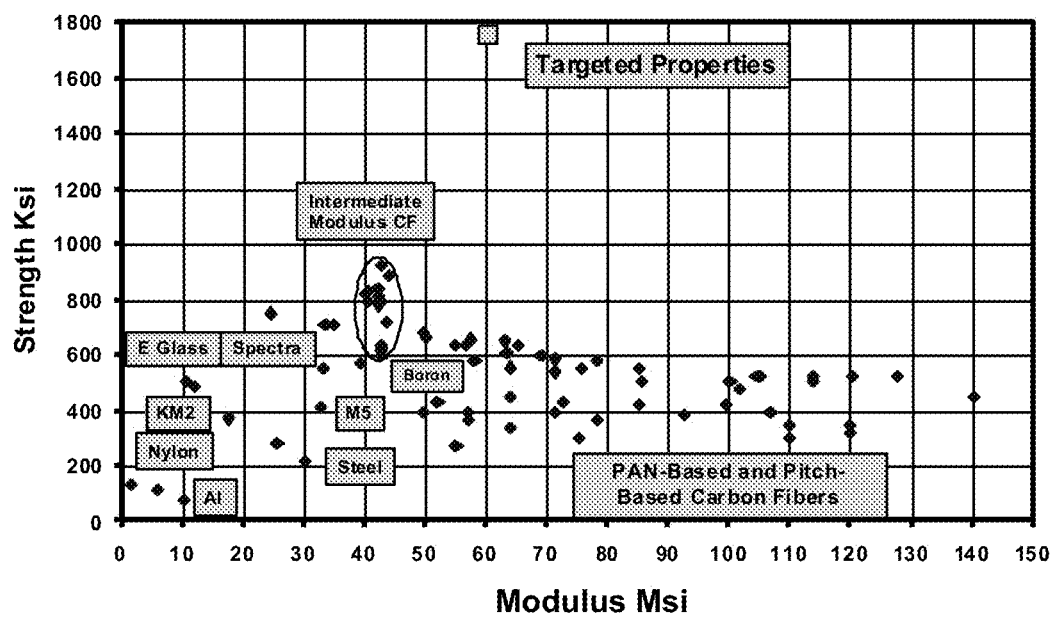
FIG. 1. Chart plotting tensile strength (ksi) and elastic modulus (Msi) for various known carbon fibers and other materials known in the art.
Figure 2:
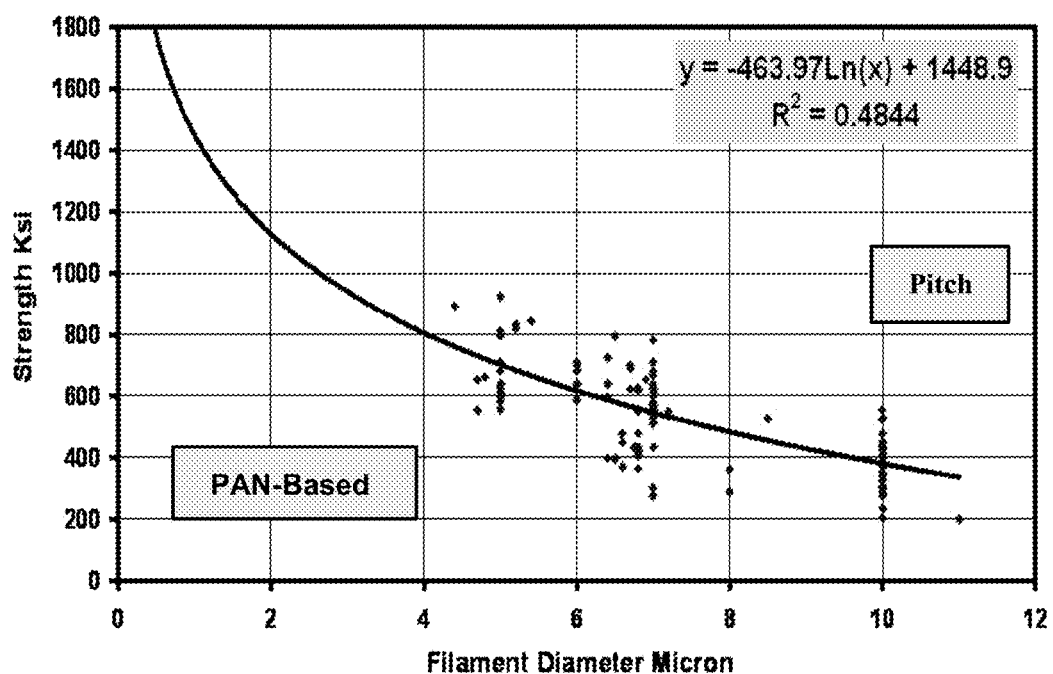
FIG. 2. Chart plotting tensile strength (ksi) as a function of carbon fiber diameter for carbon fibers derived from PAN or pitch.

As used herein, the term "about" generally indicates within ±0.5, 1, 2, 5, or 10% of the indicated value. For example, in its broadest sense, the phrase "about 20 μm" can mean 20 μm±10%, which indicates 20±2 μm or 18-22 μM.

In one aspect, the invention is directed to a method for producing a high strength high modulus carbon fiber. The term "high strength", as used herein, generally refers to a tensile strength of at least 600 kilopounds per square inch (600 ksi), which corresponds to approximately 4 GPa. In different embodiments, the carbon fiber has a tensile strength of precisely, about, at least (i.e., minimum of), or greater than, for example, 600, 650, 700, 750, 800, 850, 900, 950, 1000, 1100, 1200, 1300, 1400, 1500, 1600, 1700, 1800, 1900, or 2000 ksi, (which corresponds to approximately to 4-14 GPa) or a tensile strength within a range bounded by any two of the foregoing exemplary values. The term "high modulus", as used herein, generally refers to an elastic (i.e., tensile) modulus of at least 30 megapounds per square inch (30 msi), which corresponds to approximately 207 GPa. In different embodiments, the carbon fiber has an elastic modulus of precisely, about, at least, or greater than, for example, 30, 35, 40, 45, 50, 55, 60, 65, 70, 75, 80, 85, 90, 95, 100, 110, 120, 130, 140, or 150 msi (which corresponds to approximately 210-1050 GPa), or an elastic modulus within a range bounded by any two of the foregoing exemplary values. The term "elongation", as used herein, which is synonymous with the terms "ultimate elongation" and "elongation at break", generally refers to an elongation of at least 1.5%. In different embodiments, the carbon fiber exhibits an elongation of precisely, about, at least, or greater than, for example, 1.5%, 1.8%, 2%, 2.2%, or 2.5%, or an elongation within a range bounded by any two of the foregoing exemplary values. The carbon fiber may also advantageously possess a thermal conductivity of at least, above, up to, or less than, for example, 0.1, 1, 10, 50, 100, 150, 200, 250, 300, 350, 400, 500, 1000, 1500, 2000, or 2500 W/m-K.

The elastic modulus of the carbon fiber is believed to be mainly determined by the graphitic crystal structure in the carbon fiber, and their interactions with turbostratic domains. Conversely, carbon fibers with more discontinuous and less ordered fibrillar structures tend to develop higher tensile strengths. The strength is very sensitive to defects. In some embodiments, the produced carbon fiber has a unique morphology characterized by relatively small graphite crystals (e.g., one or more dimensional lengths less than 5, 4, 3, or 2 nm) having a relatively higher (002) spacing (e.g., a $d_{(002)}$ greater than 0.340, 0.342, 0.344, 0.346, 0.348, 0.350, or 0.352 nm).

The term "carbon", as used herein, refers to any form of carbon, including amorphous, graphitic, crystalline, and semi-crystalline forms of carbon. In some embodiments, the carbon fiber may have characteristics of a single type of carbon structure throughout the carbon fiber, while in other embodiments, the carbon fiber may have two or more types of carbon structure, e.g., a more pronounced graphitic structure on the outer surface of the carbon fiber and a more pronounced amorphous structure below the surface or in inner layers of the carbon fiber. Moreover, the term "carbon" includes fibers constructed of only elemental carbon (i.e., 100% carbon), or fibers constructed substantially of elemental carbon, generally at least 85%, 90%, 95%, 98%, or 99% elemental carbon. An element other than carbon, if included, is generally included in a dopant amount (e.g., up to or less than 10,000, 5,000, 1,000, 500, or 100 ppm). The element other than carbon can be, for example, nitrogen, boron, oxygen, sulfur, or phosphorus, or a combination thereof. The presence or absence of non-carbon elements is strongly dependent on the composition of the precursor fiber, and whether a doping gas (e.g., ammonia or oxygen) is included or excluded in the carbonization process.

The term "carbon fiber", as used herein, refers to either a single filament of carbon fiber, or a tow of carbon fiber. The carbon fiber can have any desired thickness (i.e., diameter). For example, in different embodiments, the fiber can have a thickness of 0.1, 0.2, 0.5, 1, 2, 5, 10, 15, 20, 30, 40, 50, 60, 70, 80, 90, or 100 microns, or a thickness within a range bounded by any two of these values. In some embodiments, the fiber is in the form of a tow, while in other embodiments the fiber is in the form of a single filament. Continuous filaments or tows from very low count (<500) to very high counts (>50 k) are considered herein. The carbon fibers may also be stapled or chopped to form short segments or even particles, any of which may have widths or overall or average sizes of up to or less than, for example, 1 cm, 1 mm, or 1 micron. The carbon fiber may also be in the form of a fiber, yarn, fabric, mesh (e.g., mat or web), or felt. The precursor fiber may also have any of the foregoing thicknesses, shapes, and forms.

The carbon fiber may be non-porous or porous. For porous carbon fibers, the porosity is generally a result of pores on outer and/or inner surfaces (or layers) of the carbon fiber, typically approximately perpendicular to the length of the fiber or substantially non-parallel to the length of the fiber. For a solid (i.e., non-hollow) carbon fiber, the pores may be on the outer surface (or core segments), and for hollow carbon fibers, the pores may be on the inner surface (i.e., surrounding hollow core). The pores may be mesopores, micropores, or macropores, or a combination thereof.

As used herein and as understood in the art, the terms "mesopores" and "mesoporous" generally refer to pores having a size (i.e., pore diameter or pore size) of at least 2 nm and up to 50 nm, i.e., "between 2 and 50 nm", or "in the range of 2-50 nm". In different embodiments, the mesopores have a size of precisely or about 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of these values.

As used herein and as understood in the art, the terms "micropores" and "microporous" generally refer to pores having a diameter of less than 2 nm. In particular embodiments, the micropores have a size of precisely, about, up to, or less than 0.5, 0.6, 0.7, 0.8, 0.9, 1.0, 1.1, 1.2, 1.3, 1.4, 1.5, 1.6, 1.7, 1.8, or 1.9 nm, or a particular size, or a variation of sizes, within a range bounded by any two of these values.

As used herein, the terms "macropores" and "macroporous" refer to pores having a size over 50 nm. Generally, the macropores considered herein have a size up to or less than 1 micron (1 μm). In different embodiments, the macropores have a size of precisely, about, at least, or greater than 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 325 nm, 350 nm, 375 nm, 400 nm, 425 nm, 450 nm, 475 nm, 500 nm, 550 nm, 600 nm, 650 nm, 700 nm, 750 nm, 800 nm, 850 nm, 900 nm, 950 nm, or 1000 nm, or a particular size, or a variation of sizes, within a range bounded by any two of these values.

The carbon fiber may also have any suitable surface area (generally, a specific surface area), which is strongly dependent on the level of porosity. In different embodiments, the carbon fiber may have a surface area of precisely, about, at least, greater than, or up to, for example, 5 m$^2$/g, 10 m$^2$/g, 15 m$^2$/g, 20 m$^2$/g, 30 m$^2$/g, 40 m$^2$/g, 50 m$^2$/g, 60 m$^2$/g, 70 m$^2$/g, 80 m$^2$/g, 90 m$^2$/g, 100 m$^2$/g, 150 m$^2$/g, 200 m$^2$/g, 250 m$^2$/g, 300 m$^2$/g, 350 m$^2$/g, 400 m$^2$/g, 450 m$^2$/g, 500 m$^2$/g, 600 m$^2$/g, 700 m$^2$/g, 800 m$^2$/g, 900 m$^2$/g, 1000 m$^2$/g, 1500 m$^2$/g, 2000 m$^2$/g, 2500 m$^2$/g, or 3000 m$^2$/g, or a surface area within a range bounded by any two of the foregoing values.

In the method, a carbon fiber precursor ("precursor fiber") is subjected to a magnetic field of at least 3 Tesla (3 T) during a carbonization process. In different embodiments, the magnetic field is precisely, about, at least, or greater than, for example, 3, 4, 5, 6, 7, 8, 9, 10, 11, 12, 13, 14, 15, 16, 17, or 18 Tesla, or a magnetic field within a range bounded by any two of the foregoing exemplary values. In one embodiment, the magnetic field is static. In another embodiment, the magnetic field is alternating, e.g., at a frequency of, for example, at least 10, 50, or 100 Hz and up to 0.5, 1, 5, or 10 kHz. The magnetic field can be provided by any magnetic source known in the art capable of providing the high magnetic fields required herein. In a preferred embodiment, the magnetic field is provided by a superconducting magnet. In some embodiments, a single magnet is used, while in other embodiments two or more magnets are used.

The magnet is positioned relative to the precursor fiber such that the precursor fiber is subjected to a desired magnetic field of at least 3 Tesla. The magnet can also be positioned or operated by means known in the art to orient the magnetic field in a desired direction relative to the precursor fiber. For example, the magnetic field can be oriented precisely or substantially parallel, perpendicular, or at an oblique angle to the length of the precursor fiber. In particular embodiments, the precursor fiber is carbonized in a cylindrical reaction tube surrounded by a superconducting magnet, wherein the magnetic field is typically oriented parallel to the length of the fiber when the fiber is oriented parallel to the length of the reaction tube. The foregoing embodiment can be conveniently practiced by, for example, incorporating a refractory reaction tube in the bore of a superconducting magnet. The fiber may be either continuously passed through the cylindrical reaction tube (e.g., fed from a winding of fiber) or processed in a batchwise manner. Typically, particularly in the case of a superconducting magnet, a cooling system is included to prevent overheating of the magnet.

In some embodiments, the magnetic field is maintained at the same or substantially the same magnetic field strength for the length of time that the precursor fiber is exposed to the magnetic field. In other embodiments, the magnetic field is varied in magnetic field strength, such as by a gradual or sudden increase or decrease in magnetic field strength between any of the exemplary magnetic field strengths provided above.

The reaction tube or chamber in which the precursor fiber is carbonized includes one or more heating elements to heat the reaction tube or chamber to a desired carbonization temperature. In some embodiments, the reaction tube or chamber includes one or more heating elements (e.g., a SiC heating element) on an end of the reaction tube or wall of a reaction chamber, or multiple heating elements may be located on different ends or locations (e.g., midpoint) of the reaction tube or chamber. In other embodiments, a substantially uniform temperature is provided to the length of the fiber in the tube or chamber, such as by including an induction coil (or other heating element) that surrounds at least a portion or entire length of the precursor fiber located in the reaction tube or chamber. By methods known in the art, the induction coil can be heated to a desired temperature by controlling the amount of high-frequency alternating current in its operation.

The carbonization step includes any of the conditions, as known in the art, that cause carbonization of the precursor fiber. In different embodiments, the carbonization temperature can be precisely, about, at least, above, less than, or up to, for example, 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., 1800° C., 1900° C., 2000° C., 2100° C., or 2200° C., or a temperature within a range bounded by any two of the foregoing temperatures (e.g., at least 400° C. and less than 2200° C.). The amount of time that the precursor fiber is subjected to the carbonization temperature (i.e., carbonization time) is highly dependent on the carbonization temperature employed. Generally, the higher the carbonization temperature employed, the shorter the amount of time required. In different embodiments, depending on the carbonization temperature and other factors (e.g., pressure), the carbonization (processing) time can be, for example, about, at least, or no more than 0.02, 0.05, 0.1, 0.125, 0.25, 0.5, 1, 2, 3, 4, 5, 6, 7, 8, 9, 10, 11, or 12 hours, or within a range therein. In particular embodiments, it may be preferred to gradually raise the temperature at a set or varied temperature ramp rate (e.g., 5° C./min, 10° C./min, or 20° C./min). In particular embodiments, it may be preferred to pass the precursor fiber through a furnace with a gradient of temperature at the entrance and exit of the furnace and at a set temperature inside the furnace in order to achieve the desired residence time. In other embodiments, it may be preferred to subject the precursor fiber to a sudden (i.e., non-gradual) carbonization temperature. In some embodiments, after the precursor fiber is subjected to a desired carbonization temperature for a particular amount of time, the temperature is reduced either gradually or suddenly.

In particular embodiments, the carbonization process includes a low temperature carbonization step and a high temperature carbonization step, which may be run at different temperatures independently selected from any of the exemplary temperatures provided above. The low temperature step is generally employed as a pyrolysis step, i.e., to remove volatiles. The low temperature step is preferably conducted at a temperature of at least or above 400, 500, or 600° C., and up to or less than 800, 900, 1000° C., 1100° C., or 1200° C. The high temperature step is generally employed to substantially or completely carbonize the precursor. The high temperature step is preferably conducted at a temperature of at least or above 1200, 1300, 1400, 1500, 1600, 1700, 1800, 1900, 2000, or 2100° C., or at a temperature within a range bounded by any two of the foregoing temperatures, or at a temperature within a range bounded by any of the foregoing temperatures and up to or less than 2200° C. The processing times for the low and high temperature steps can each be, independently, any of the amount of times provided above. Alternatively, the combined time for the low and high temperature steps may correspond to any of the processing times provided above. If desired, one or more additional carbonization steps may be included with temperatures intermediate to the first and second carbonization steps. In some embodiments, the different steps are characterized by a distinct (i.e., non-gradual) change in temperature, such as from 600° C. in a low temperature step to 1200° C. or higher in a high temperature step. Preferably, the precursor fiber is maintained in the same reaction tube when subjected to successive carbonization steps. In other embodiments, the demarcation between carbonization steps is not so distinct, such as by gradually increasing the carbonization temperature to transition from one step into the next.

In the two-step carbonization process, the precursor fiber can be subjected to the magnetic field either during the low temperature or high temperature carbonization step, or in both the low temperature and high temperature carbonization steps. In one set of embodiments, the precursor fiber is subjected to a magnetic field of precisely, about, at least, or greater than, for example, 3, 4, 5, 6, 7, 8, 9, 10, 11, 12, 13, 14, 15, 16, 17, or 18 Tesla during the low temperature carbonization step, and not subjected to a magnetic field during the high temperature step. In another set of embodiments, the precursor fiber is subjected to a magnetic field of precisely, about, at least, or greater than, for example, 3, 4, 5, 6, 7, 8, 9, 10, 11, 12, 13, 14, 15, 16, 17, or 18 Tesla during the high temperature carbonization step, and not subjected to a magnetic field during the low temperature step. In another set of embodiments, the precursor fiber is subjected to a magnetic field of precisely, about, at least, or greater than, for example, 3, 4, 5, 6, 7, 8, 9, 10, 11, 12, 13, 14, 15, 16, 17, or 18 Tesla during both the high and low temperature carbonization steps, wherein the magnetic field employed in each step is independently selected, and may be the same or different. In yet other embodiments, the precursor fiber is subjected to a magnetic field of any desired strength of at least 3 T only when a particular temperature is reached, and eventually the magnetic field is removed after a specified period of time or when a second temperature is reached (wherein the second temperature may be higher or lower than the first temperature).

If desired, the precursor fiber, or alternatively, the carbonized fiber, can be subjected to a temperature high enough to produce a graphitized carbon fiber. Typically, the temperature capable of causing graphitization is a temperature of at least, above, or up to, for example, 2200° C., 2300° C., 2400° C., 2500° C., 2600° C., 2700° C., 2800° C., 2900° C., 3000° C., 3100° C., or 3200° C., or a temperature within a range bounded by any two of the foregoing temperatures (e.g., at least or above 2200° C. and up to or less than 3200° C.). The graphitization process may or may not also include a magnetic field, such as any of the magnetic field strengths provided above for the carbonization process.

The time that the precursor fiber is exposed to the magnetic field is typically the same, or about the same, as the processing time for the carbonization process or a carbonization step. However, in some embodiments, the time that the precursor fiber is exposed to the magnetic field is less or greater than the carbonization processing time. For example, in some embodiments, the precursor fiber may be subjected to the magnetic field only toward the end of the carbonization process, or end of a low or high temperature carbonization step. In other embodiments, the precursor fiber may be subjected to the magnetic field only around the start of the carbonization process, or start of a low or high temperature carbonization step. In yet other embodiments, the precursor fiber may be subjected to the magnetic field only around the midpoint of the carbonization process, or midpoint of a low or high temperature carbonization step. The magnetization may also be continued for a designated period of time as a post-conditioning process, i.e., after carbonization or graphitization has been completed, or during a cool down period.

The magnetization employed during any part of the carbonization process described herein (e.g., during the carbonization step, and/or during a graphitization or stabilization step) may be unchanging in magnitude and/or polarity (i.e., static, level, or continuous), or alternatively, may vary in magnitude and/or polarity. In particular embodiments, the magnetization alternates at a specified frequency. The frequency can be, for example, 1, 5, 10, 50, 100, 200, 300, 400, 500, 1000, 2000, 5000, 10,000, 15,000, or 20,000 Hz.

Typically, the carbonization or graphitization step is conducted in an atmosphere substantially devoid of a reactive gas (e.g., oxygen or hydrogen), and typically under an inert atmosphere. Some examples of inert atmospheres include nitrogen ($N_2$) and the noble gases (e.g., helium or argon). The inert gas is generally made to flow at a specified flow rate, such as 0.1, 0.25, 0.50, 1, 5, 10, 20, or 30 L/min. However, one or more reactive functionalizing species may be included in the carbonization step or in a post-treatment step (e.g., at the exit of the furnace as a post-carbonization step) to suitably functionalize the carbon fiber, e.g., by inclusion of a fluorocarbon compound to fluorinate, or inclusion of an oxygen-containing species to oxygenate (e.g., by forming hydroxy or ether groups), or inclusion of amino-, thio-, or phosphino-species to, respectively, aminate, thiolate, or phosphinate the carbon fiber. Thus, in some embodiments, it may be desired to include at least one reactive gas, such as oxygen, hydrogen, ammonia, an organoamine, carbon dioxide, methane, a fluoroalkane, a phosphine, or a mercaptan. The one or more reactive gases may, for example, desirably change or adjust the compositional, structural, or physical characteristics of the carbon fiber. The functionalized groups on the carbon fiber can have a variety of functions, e.g., to bind to metal species that are catalytically active, or to modify or adjust the surface miscibility, absorptive, or wetability characteristics, such as for gas absorption and filtration applications.

The pressure employed in the carbonization (or graphitization) step is typically ambient (e.g., around 1 atm). However, in some embodiments, it may be preferred to use a higher pressure (e.g., above 1 atm, such as 1.5, 2, 5, 10, 20, 50, or 100 atm, or within a range therein) to, for example, maintain a positive pressure inside the reaction tube, chamber, or furnace and keep the sample free of oxygen at high temperature to avoid combustion or partial combustion. In other embodiments, it may be preferred to use a lower pressure (e.g., below 1 atm, such as 0.5, 0.1, 0.05, or 0.01 atm, or within a range therein).

In some embodiments, the precursor fiber is subjected to a stress (tension) along the length of the fiber during stabilization and/or carbonization. The stress can be applied to, for example, avoid fiber shrinkage, or to favorably affect or adjust properties of the resulting carbon fiber, such as fiber strength, elasticity, elongation, crystallinity, morphology, and pore size distribution. In different embodiments, the fiber, either during stabilization and/or carbonization, is subjected to 0.1, 0.3, 0.5, 1, 2, 5, 10, or 20 MPa of stress. In other embodiments, no tension is applied to the fiber during stabilization and/or carbonization.

In other embodiments, the carbon fiber precursor is also subjected to electromagnetic, plasma, or particle beam (e.g., electron or neutron beam) radiation during the carbonization process. The electromagnetic, plasma, or particle beam exposure generally has the effect of improving the strength and/or modulus of the resulting carbon fiber. The operation and use of electromagnetic, plasma, and particle beam radiation techniques are well known in the art.

The precursor fiber can have any composition known in the art that can produce a carbon fiber when subjected to carbonization conditions. The precursor fiber can include or be composed of, for example, polyacrylonitrile (PAN), a polyolefin, lignin, viscose, rayon, or pitch. Some examples of polyolefin fiber compositions include polyethylene, polypropylene, or a homogeneous or heterogeneous composite thereof, or a copolymer thereof. In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra high molecular weight polyethylene (UHMWPE). In the case of polypropylene, the polypropylene can also be any of the types of polypropylenes known in the art, e.g., isotactic, atactic, and syndiotactic polypropylene. The precursor fiber may also be derived from, or include segments or monomeric units of other addition monomers, such as styrene, acrylic acid, methacrylic acid, methyl acrylate, methyl methacrylate, and butadiene.

In particular embodiments, the precursor fiber includes polyacrylonitrile (PAN) by being either a homopolymer of PAN (i.e., 100 wt % PAN) or a copolymer that contains PAN, wherein the term "copolymer" is meant to also include terpolymers and higher copolymers that include PAN. The PAN copolymer contains PAN along with one or more types of non-PAN monomer units (or one or more blocks or segments of non-PAN polymer). The PAN in such copolymers can be in a primary amount (i.e., greater than 50 wt % or mol %), secondary amount (i.e., less than 50 wt % or mol %), or in an equal amount by weight or moles. In different embodiments, the PAN is included in the copolymer in an amount of about, at least, greater than, up to, or less than, for example, 2, 5, 10, 15, 20, 30, 40, 50, 60, 70, 80, 90, 95, 98, or 99 wt % or mol %. The copolymer can be, for example, a block, random, alternating, or graft copolymer.

A PAN-containing fiber may also be composed of a homopolymer or copolymer composite of PAN and one or more other polymers. The composite can be in the form of, for example, an admixture of PAN (homopolymer or copolymer) and one or more non-PAN polymers, wherein the admixture may be homogeneous or heterogeneous. An example of a heterogeneous PAN-containing fiber composite is one that includes separate strands of PAN and non-PAN fibers (e.g., by interweaving or wrapping). In other embodiments, the PAN-containing fiber or tow is composed of both a copolymer of PAN and a homogeneous or heterogeneous composite of the PAN copolymer and one or more other polymers.

The non-PAN copolymer units are typically addition polymers derived from any of the unsaturated (generally, olefin) monomer precursors known in the art for producing such polymers. In particular embodiments, the non-PAN copolymer units are derived from unsaturated carboxylate precursor molecules, unsaturated amide precursor molecules, or a combination thereof. The unsaturated carboxylate precursor molecule generally contains at least one carbon-carbon double bond and at least one carboxylic acid or carboxylic ester group, wherein a carbon atom of the olefinic group is often bound to the carbonyl carbon atom of the carboxylic acid or carboxylic ester group. Some examples of unsaturated carboxylate precursor molecules include methyl acrylate, ethyl acrylate, propyl acrylate, butyl acrylate, methylmethacrylate, (2-hydroxyethylacrylate), vinyl acetate, acrylic acid, methacrylic acid, and itaconic acid. The unsaturated amide precursor molecule generally contains at least one carbon-carbon double bond and an amide group (which can be N-substituted or N,N-disubstituted), wherein a carbon atom of the olefinic group is often bound to the carbonyl carbon atom of the amide group. Some examples of unsaturated amide precursor molecules include acrylamide, methacrylamide, N-alkyl derivatives thereof, and N,N-diallyl derivatives thereof.

The carbon fiber precursor, and particularly a PAN or PAN copolymer precursor, may, in some embodiments, be doped with a solid carbonaceous material. The carbonaceous material particularly considered herein is one that includes or is made completely of elemental carbon (or carbon and hydrogen). Moreover, the carbonaceous material may or may not be heteroatom-doped, such as with nitrogen, boron, oxygen, sulfur, or phosphorus. Some examples of carbonaceous materials include graphene, graphene oxide, graphene nanoribbons, graphite, carbon fibers, carbon black, activated carbon, carbon foam, amorphous carbon, and fullerenes (e.g., single-walled carbon nanotubes and multi-walled carbon nanotubes). In different embodiments, the carbonaceous material may be included in an amount of at least, above, up to, or less than, for example, 1, 2, 3, 4, 5, 10, 15, or 20 wt % by weight of the carbon fiber precursor.

Generally, the carbon fiber precursor, prior to the carbonization process, is subjected to a stabilization process. As known in the art, the stabilization process renders the precursor infusible so that it becomes largely carbonizable rather than volatile. The fiber precursor can be subjected to any of the stabilization processes of the art, as appropriate. In one embodiment, the fiber precursor is subjected to a thermal oxidative stabilization process, such as by exposure of the fiber precursor to air or other oxidant (e.g., reactive oxidizing species) at a temperature of about 200 to 400° C. Such thermal oxidative stabilization processes are well known in the art. In another embodiment, the fiber precursor is subjected to a plasma (non-thermal or thermal) stabilization process, as described in, for example, U.S. Pat. Nos. 7,824,495, 7,786,253, 7,649,078, 7,534,854, 6,375,875, and 6,372,192, the combined subject matter of which is herein incorporated by reference in its entirety. In yet another embodiment, the fiber precursor is subjected to a chemical stabilization, such as a liquid immersion sulfonation process, as described in, for example, U.S. Pat. No. 4,020,145, the subject matter of which is herein incorporated by reference in its entirety.

In one embodiment, the stabilization process is conducted in the absence of a magnetic field, i.e., the fiber precursor is not in contact with a magnetic field during the stabilization process. In another embodiment, the stabilization process is conducted in the presence of a magnetic field of at least 1 Tesla, i.e., the fiber precursor is in contact with a magnetic field during the stabilization process. In different embodiments, the magnetic field used in the stabilization process is precisely, about, at least, or greater than, for example, 3, 4, 5, 6, 7, 8, 9, 10, 11, 12, 13, 14, 15, 16, 17, or 18 Tesla, or a magnetic field within a range bounded by any two of the foregoing exemplary values In other aspects, the invention is directed to the produced carbon fibers, or a composite material in which the produced carbon fibers are incorporated. An example of such a composite material is a polymeric matrix in which the carbon fibers are incorporated. Some examples of polymeric matrices include thermoset resins (e.g., an epoxy, vinyl ester, or unsaturated polyester) and thermoplastic resins (e.g., a polyamide, polyimide, polyester, polyetherketone, polyetherether-ketone, polyphenylene sulfide, or polyolefin, such as polyethylene or polypropylene). The carbon fibers may or may not be functionalized or coated with an appropriate sizing agent, as known in the art, in order to improve the handling and interaction between the carbon fiber and matrix. Prior to functionalization with a sizing agent and/or incorporation into a matrix, the carbon fiber may or may not also be surface treated (e.g., by surface oxidation techniques known in the art) to incorporate reactive functional groups on the surface. Moreover, in some embodiments, the produced carbon fibers are in the form of a woven or non-woven mat or weave. The carbon fibers can be made into such a form by, for example, interweaving stabilized or non-stabilized precursor fiber prior to carbonization. The carbon fibers may also be in a fused state, and in particular, in the form of a three-dimensional, interconnected mat or felt. The carbon fibers may be fused by initially fusing fiber precursors before carbonization, or the carbon fibers may be fused by a fusion process after the carbonization process. Fiber precursors or carbon fibers may be fused by, for example, applying a bonding agent or by melt pressing the fibers by means known in the art.

Examples have been set forth below for the purpose of illustration and to describe certain specific embodiments of the invention. However, the scope of this invention is not to be in any way limited by the examples set forth herein.

EXAMPLE 1

Carbon Fiber Precursor Preparation and Processing

Figure 3:
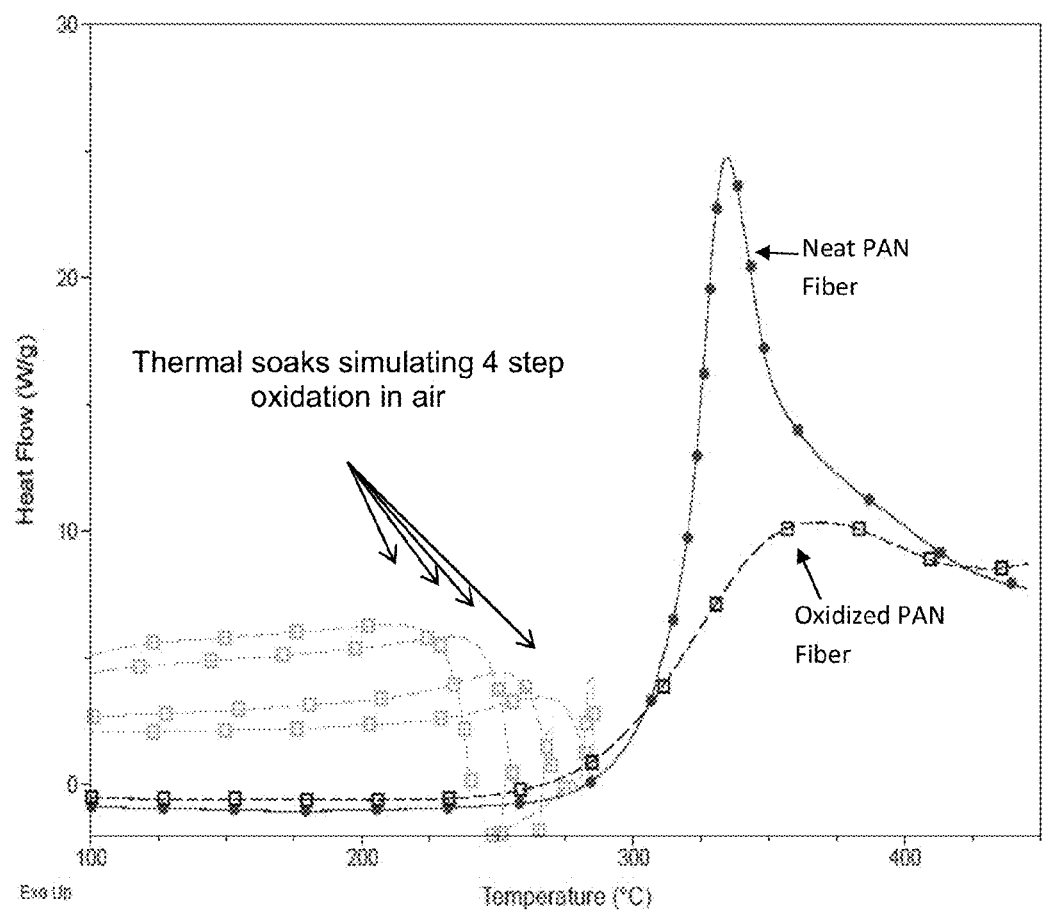
FIG. 3. Differential scanning calorimetry (DSC) thermograms showing exothermic reaction of the neat PAN fiber and oxidized fibers in air.

PAN-based carbon precursor fibers of 3000 filaments were obtained from a commercial source and used in this study. The filaments were 13 microns in diameter. Pre-oxidized PAN fibers of 12,000 filaments were also used in this study. The oxidized fibers have a density of 1.40 g/cc. FIG. 3 provides differential scanning calorimetry (DSC) thermograms showing the exothermic reaction of PAN in air. As shown by the exotherms in FIG. 3, the neat precursor shows a sharp peak with significantly higher heat of reaction value while oxidized fiber shows a small remnant heat of reaction.

EXAMPLE 2

Thermo-Magnetic Process

The Process

Figure 4:
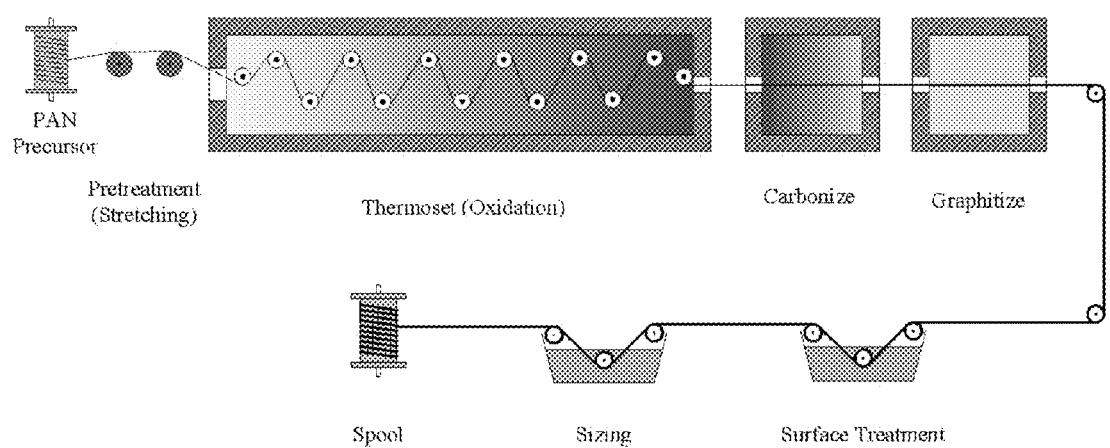
FIG. 4. Flow diagram showing an exemplary magneto-carbonization process for PAN precursor.

Carbon fibers were generally produced from organic precursors by extrusion and filament generation followed by thermal carbonization of the precursor by thermo-oxidative crosslinking followed by graphitization in an inert atmosphere. The PAN-carbon precursor was processed according to the flow process shown in FIG. 4. Oxidative-crosslinking makes the precursor infusible and helps individual filaments retain their shape. During processing of the precursors, an applied axial stress is maintained at each step in order to get aligned structural carbon material.

The thermo-magnetic processing device consisted of a superconducting magnet with a 5" diameter warm bore and uniform 9 Tesla field strength over an 8" work zone, with the capability of inductively heating material specimens up to 2000° C. in the work zone. The device equipped with fiber handling peripheral tools is schematically displayed in FIG. 5. For oxidation of 3000-filament virgin PAN fiber tow, 2N tension was applied for four different passes through the magnet bore at 230, 240, 250, and 260° C., at 9 T and 0 T magnetic field strengths, respectively, for in-field and no-field oxidation conditions. It was observed that, at 9 T field strength, fiber oxidation occurred slowly. At 0 T field strength, the fibers exhibited 1.37 g/cc density in the oxidized fiber after a third pass (230, 240, and 250° C.) whereas, at 9 T applied field strength, the fibers after four consecutive passes through the magnet at 230, 240, 250, and 260° C. exhibited a density of 1.32 g/cc. Because of the slow process oxidation in the magnetic field, fiber orientation is advantageously retained. However, a significant amount of time was required to get the fibers to a carbonizable state.

Figure 5:
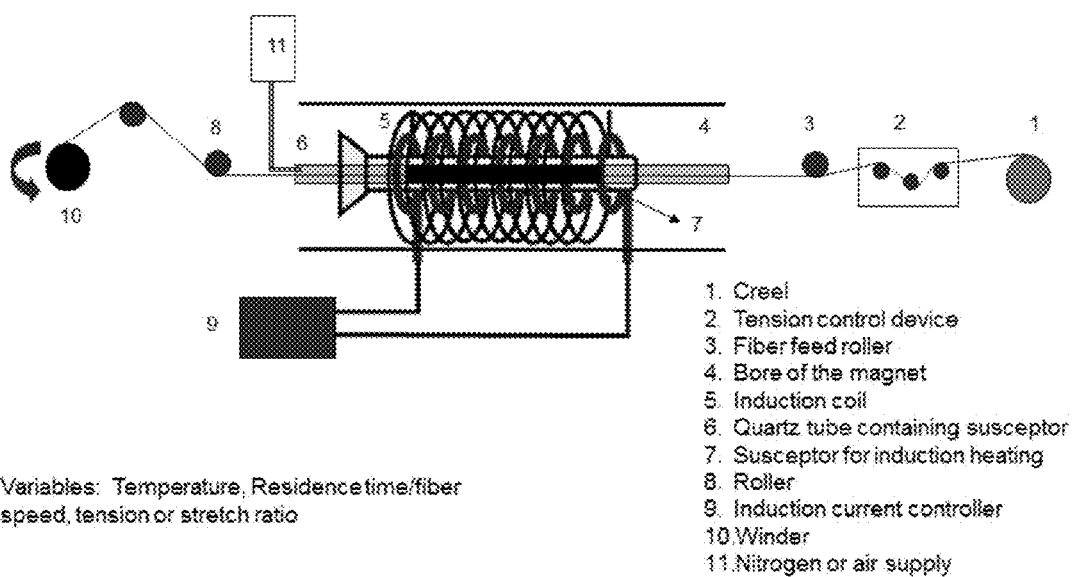
FIG. 5. Schematic of the magnetic field processing device equipped with fiber handling peripheral tools.

Carbonization of pre-oxidized fibers of 12000 filaments (density 1.40 g/cc) was conducted using the device shown in FIG. 5 in two stages. In the first stage, the temperature was maintained at 600-650° C. at a variable magnetic field strength of 0-9 T. In the second stage, high temperature carbonization of the low-temperature carbonized sample was conducted at a variable temperature of 1000-2000° C. under magnetic field strengths of 0, 1, 3, 5, and 9 T. In all cases, a tension of 8.4 N was applied on the tow.

Results and Discussion

Figure 6:
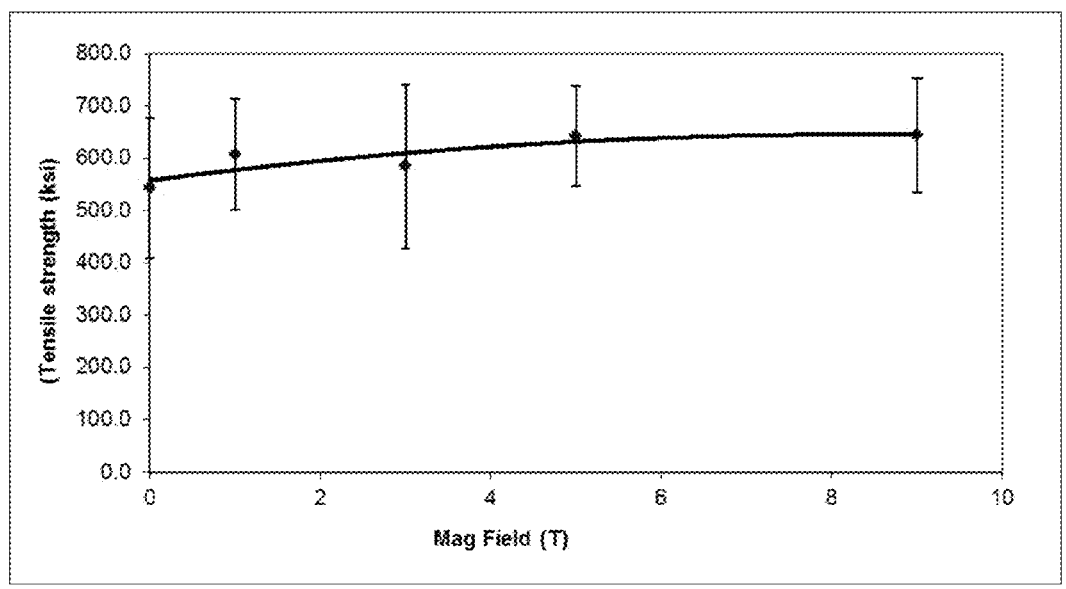
FIG. 6. The plot of ultimate strength of high temperature carbonized fibers at varied field strength FIG. 7. Graph plotting tensile strength (ksi) vs. temperature of the final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps.

The carbonized fiber from low temperature carbonization at 600° C. was subsequently carbonized at 1400° C. at 0-9 T field strength. The application of magnetic field improves tensile strength, and the properties tend to level at 5 T field strength. The plot of ultimate strength of high temperature carbonized fibers at varied field strength is displayed in FIG. 6.

Tensile test equipment, MTS Alliance RT/5 with a 5 N load cell, was used for the single carbon fiber tensile tests. Single filaments were glued on paper tabs using cyanoacrylate based adhesive. The standard single filament test method, ASTM D 3822-07, was used to characterize the tensile mechanical properties of investigated carbon fibers. The gauge length of 25 mm and crosshead speed of 0.5 mm/sec were applied. Twenty single filaments were tested for each fiber type.

Figure 7:
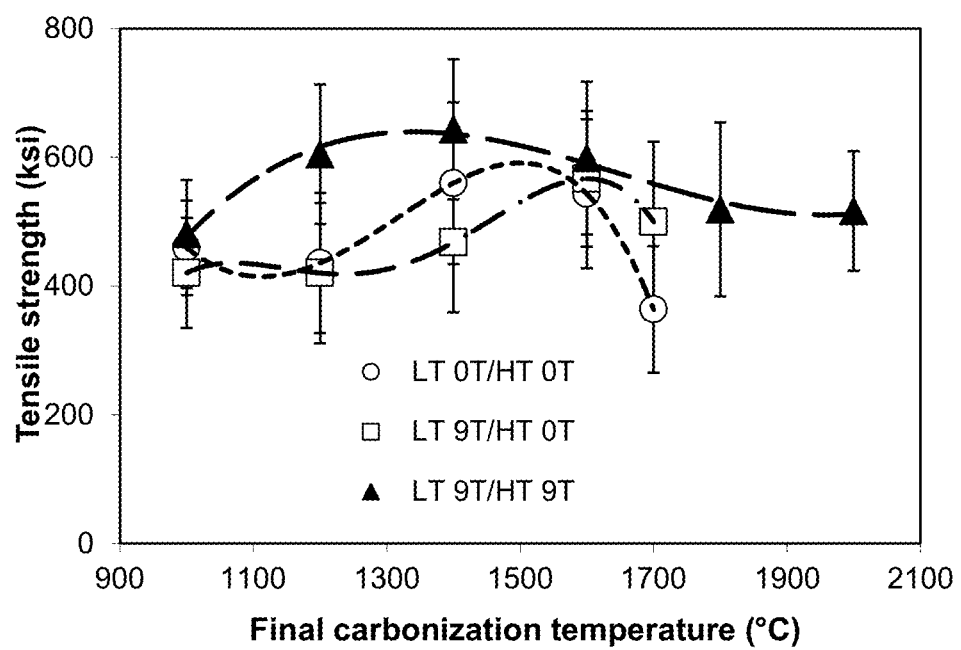

FIG. 7 is a graph plotting tensile strength (ksi) vs. temperature of final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps. As shown by FIG. 7, filaments carbonized at 9 T magnetic field show improved tensile strength compared to control fibers that were not subjected to a magnetic field. In particular, at 1400° C., the filaments show a 15% strength enhancement.

Figure 8:
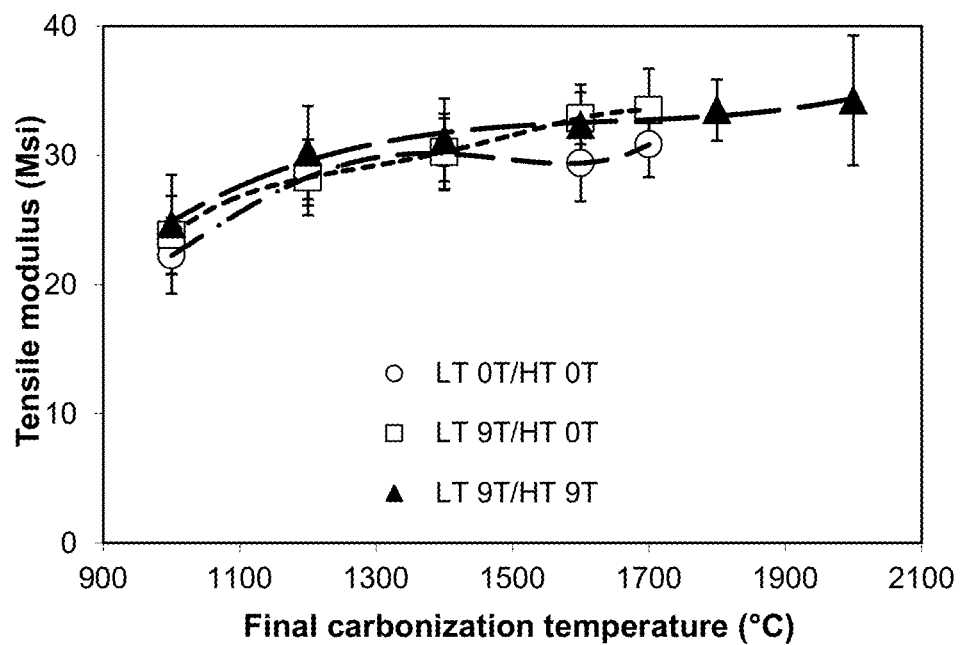
FIG. 8. Graph plotting tensile modulus (msi) vs. temperature of the final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps.
Figure 9:
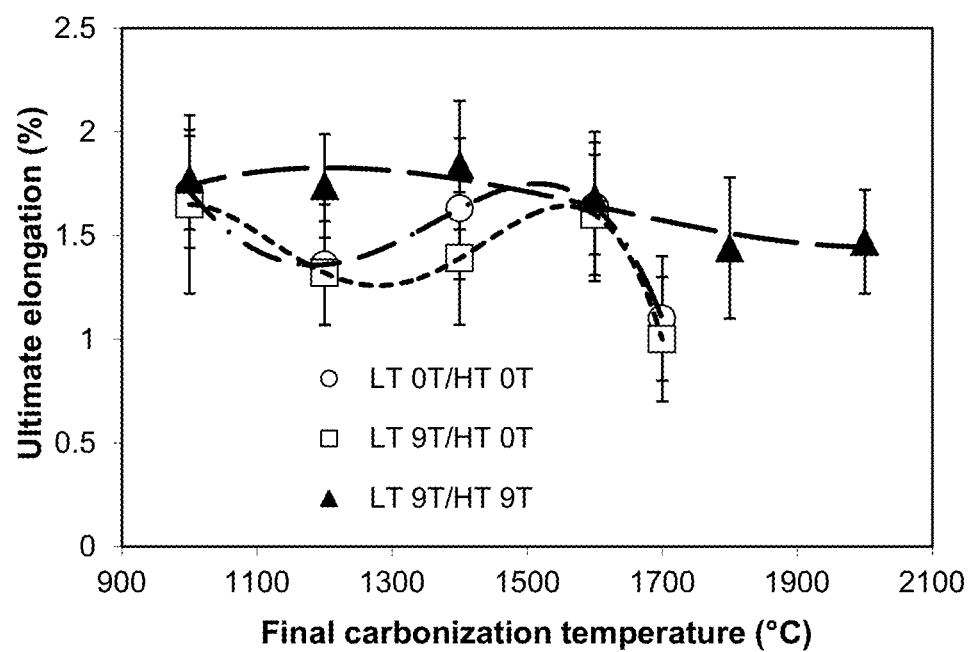
FIG. 9. Graph plotting ultimate elongation (%) vs. temperature of the final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps.

FIG. 8 is a graph plotting tensile modulus (msi) vs. temperature of final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps. FIG. 9 is a graph plotting ultimate elongation (%) vs. temperature of final (high temperature) carbonization step for (a) no magnetic field (i.e., 0 T) for both low temperature (LT) and high temperature (HT) carbonization steps, (b) 9 T magnetic field for LT carbonization step and 0 T for HT carbonization step, and (c) 9 T for both LT and HT carbonization steps. As shown by FIGS. 8 and 9, although modulus values of fibers carbonized under 9 T is slightly higher than the control condition filaments, the fibers exhibit an improved ultimate elongation even when carbonized at very high temperature.

The carbonized tow was also characterized by wide angle x-ray diffraction (XRD), and the results are provided in the table below.

TABLE 1

XRD data of the carbonized tow.

| 1400° C. carbonized fiber ID | FWHM at (002) azimuthal scan (misorientation angle) | D-spacing (Å) | Lc (Å) |
|---|---|---|---|
| LT 0T/HT 0T (control) | 22.8 | 3.476 | 20.4 |
| LT 9T/HT 0T | 25.3 | 3.524 | 18.1 |
| LT 9T/HT 9T | 19.6 | 3.528 | 18.0 |

Figure 10:
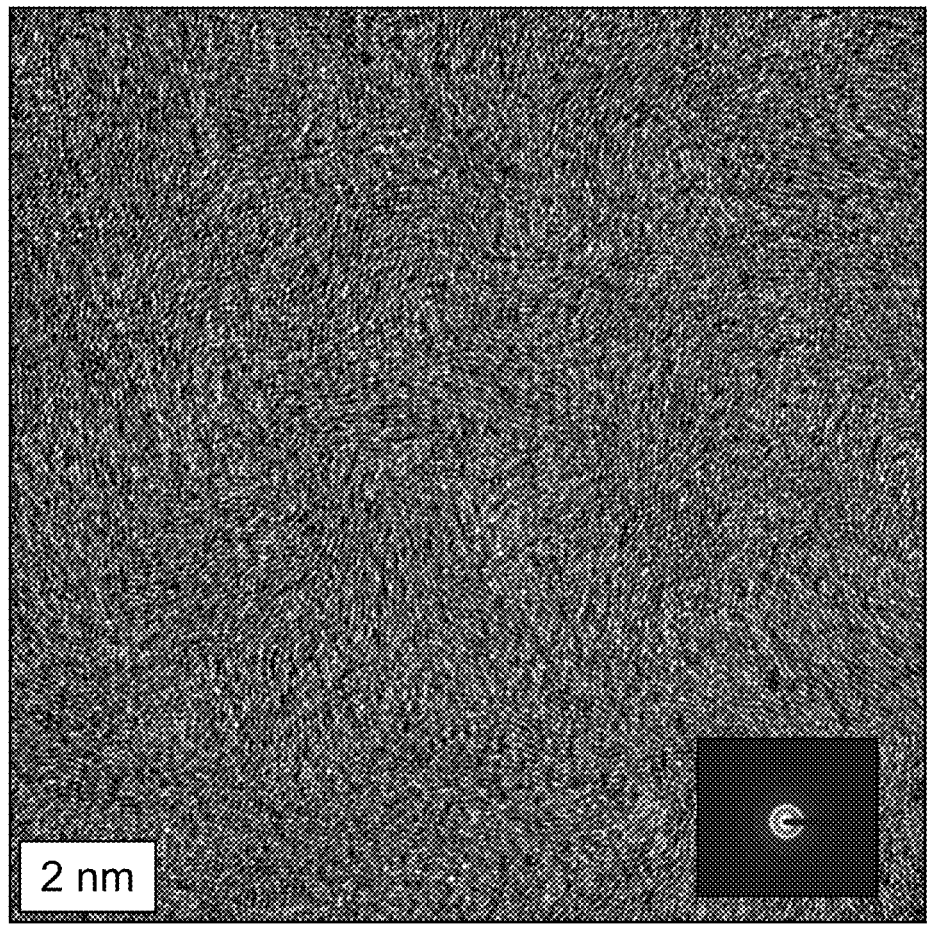
FIG. 10. Transmission electron microscopy of a carbon fiber produced by thermo-magnetic processing.

As shown by the data in Table 1, high temperature carbonization under a magnetic field reduces the misorientation angle, i.e., it aligns the (002) planes along the fiber axis, and it increases the d-spacing of the planes and slightly lowers the value of Lc. Thus, a turbostratic carbon morphology is produced with a high degree of interconnection between the graphitic layers and amorphous carbon, which is believed to be largely responsible for the enhanced degree of elongation before tensile failure. Transmission electron microscopy images of the carbon fiber produced by thermomagnetic processing is provided in FIG. 10. The selected area diffraction pattern shows a random orientation of the graphitic structures.

Figure 11:
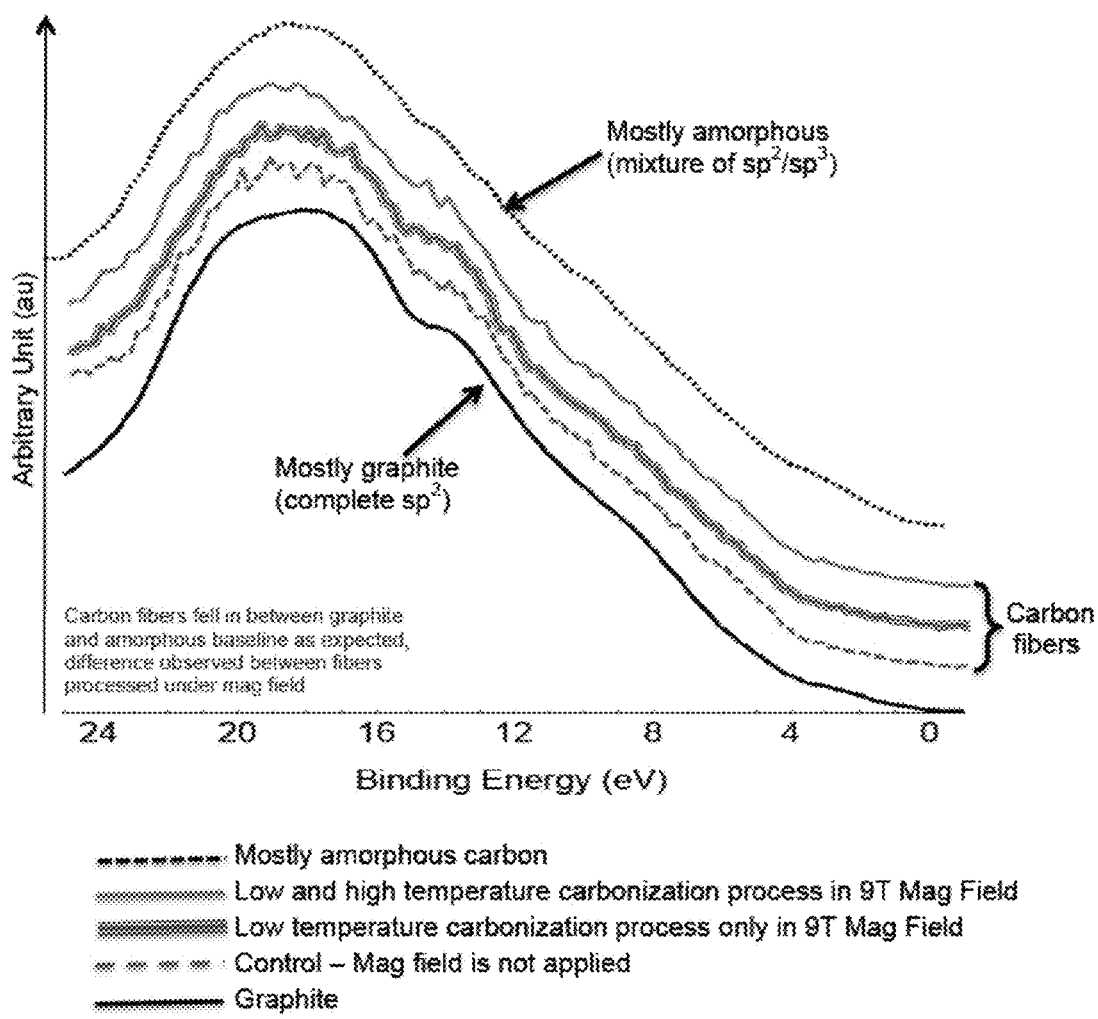
FIG. 11. X-ray photoelectron spectroscopy (XPS) data used for qualitative evaluation of the $sp^3$ population.

FIG. 11 shows x-ray photoelectron spectroscopy (XPS) data that can be used for qualitative evaluation of the $sp^3$ population, with comparison of the valence band region for the fiber processed using a magnetic field, no magnetic field (control), and for amorphous and graphitic carbon. The dotted line shown in FIG. 11 indicates a mixture of $sp^2$ and $sp^3$. Magnetic-field carbonization tends to incorporate and enhance $sp^3$ carbon content.

Figure 12:
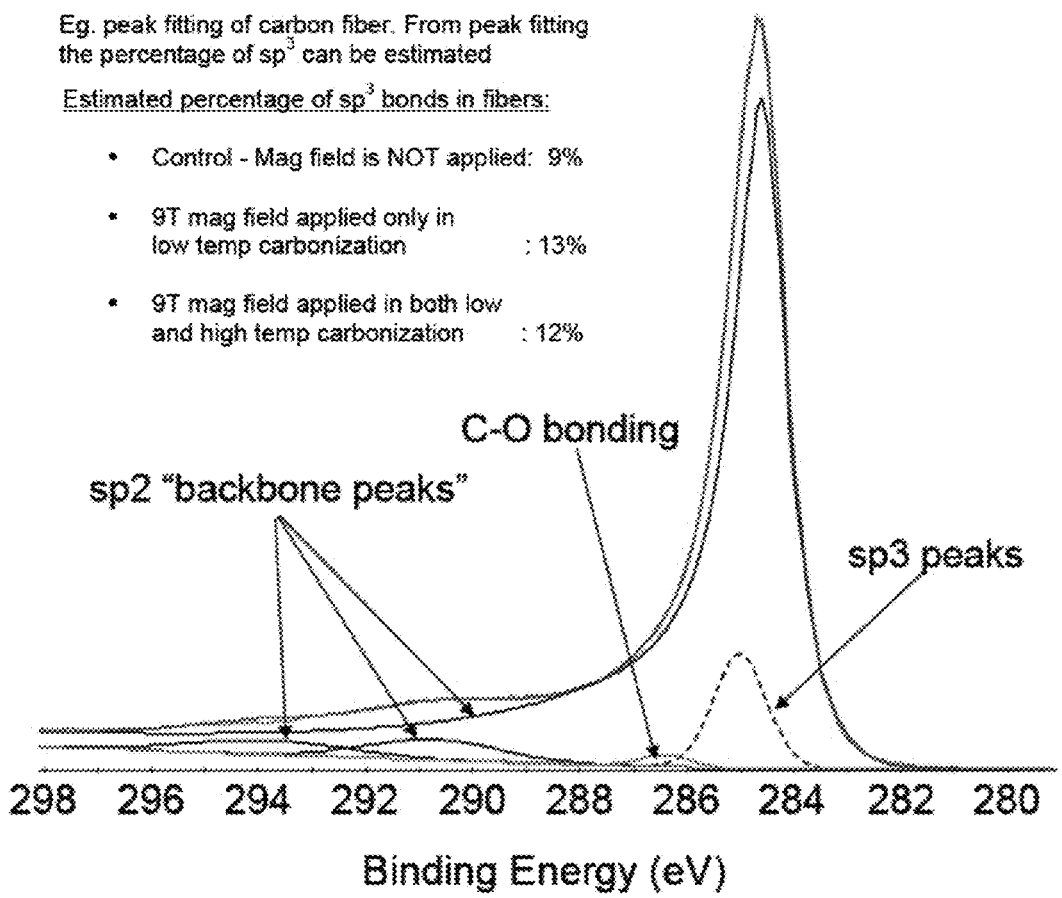
FIG. 12. C1s peak obtained by X-ray photoelectron spectroscopy, wherein the $sp^3$ carbon content was calculated from C1s peak.

FIG. 12 shows the C1s peak obtained by x-ray photoelectron spectroscopy. The $sp^3$ carbon content can be calculated from the C1s peak. Example shows the typical deconvolution of the C1s peak and $sp^3$ amount in carbon fibers altered after the magnetic field processes, as compared to control.

Figure 13:
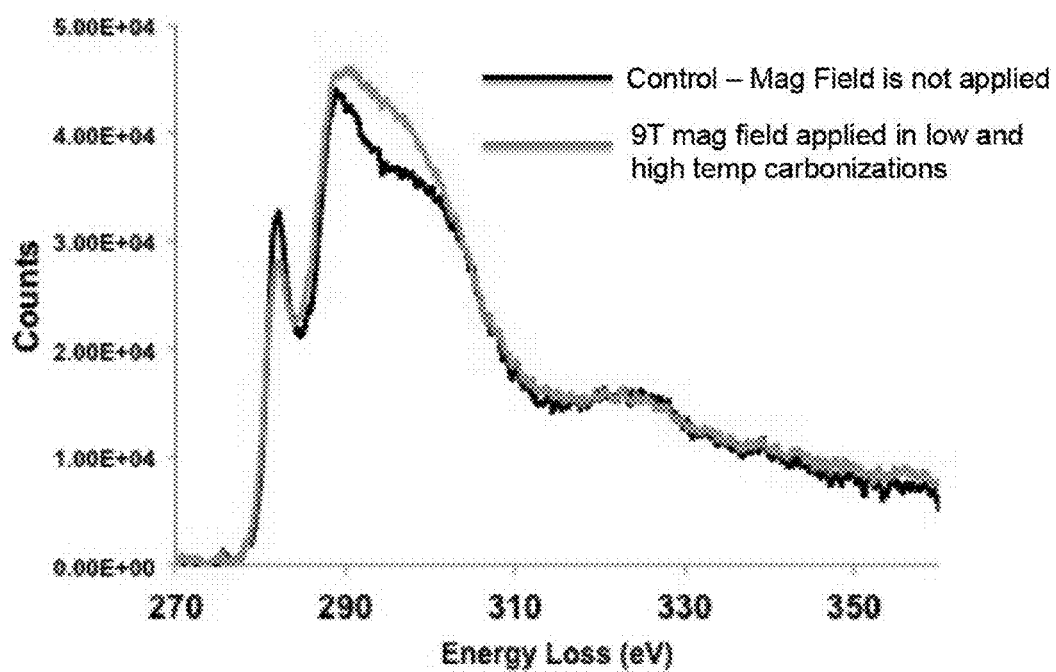
FIG. 13. Electron Energy Loss Spectroscopy (EELS) spectrum showing two characteristic features: the first a transition peak at ~284 eV and the second π transition peak occurring at 291-310 eV.

FIG. 13 shows the electron energy loss spectroscopy (EELS) spectrum. The EELS spectrum has two characteristic features: the first a transition peak at ~284 eV and the second π transition peak occurring at 291-310 eV. Comparing the (EELS) data from the outermost portions of control fiber and 9 T magnetic field applied during carbonization process together as shown in FIG. 13, it is observed that the control fiber contains a more graphitic (or less amorphous) signature as evidenced from the first peak at ~284 ev. In the EELS data analysis, the fibers processed under a magnetic field possess a higher amount of $sp^3$-type bonds as compared to the control fiber. The data are in agreement with XPS and diffraction characterization.

Lastly, porosity measurements using small angle x-ray scattering analysis shows that the pore size reduced by 1%, i.e., from 8.8% to 7.8%, when the samples were carbonized under a 9 T magnetic field.

While there have been shown and described what are at present considered the preferred embodiments of the invention, those skilled in the art may make various changes and modifications which remain within the scope of the invention defined by the appended claims.

What is claimed is:

1. A method for producing a carbon fiber, the method comprising subjecting a carbon fiber precursor to a magnetic field of at least 3 Tesla with said magnetic field periodically alternating at a frequency of 1–20,000 Hz during a carbonization process, wherein said carbonization process is conducted at a temperature of at least 400° C. and less than 2200° C. to form said carbon fiber, wherein the produced carbon fiber is substantially resilient and substantially defect-free.

2. The method of claim 1, wherein said carbonization process comprises a low temperature carbonization step conducted at a temperature of at least 400° C. and less than 1200° C., followed by a high temperature carbonization step conducted at a temperature above 1200° C.

3. The method of claim 2, wherein said low temperature carbonization step is conducted at a temperature of at least 500° C. and less than 1200° C.

4. The method of claim 3, wherein said high temperature carbonization step is conducted at a temperature of at least 1400° C.

5. The method of claim 3, wherein said high temperature carbonization step is conducted at a temperature of at least 1500° C.

6. The method of claim 3, wherein said high temperature carbonization step is conducted at a temperature of at least 1800° C.

7. The method of claim 3, wherein said said high temperature carbonization step is conducted at a temperature of at least 2000° C.

8. The method of claim 2, wherein said carbon fiber precursor is subjected to said magnetic field of at least 3 Tesla during the low temperature carbonization step and not during the high temperature carbonization step.

9. The method of claim 2, wherein said carbon fiber precursor is subjected to said magnetic field of at least 3 Tesla during the high temperature carbonization step and not during the low temperature carbonization step.

10. The method of claim 2, wherein said carbon fiber precursor is subjected to said magnetic field of at least 3 Tesla during both the low temperature carbonization step and the high temperature carbonization step.

11. The method of claim 1, wherein said carbon fiber precursor has a composition comprised of polyacrylonitrile, polyolefin, lignin, viscose, rayon, or pitch.

12. The method of claim 1, wherein said carbon fiber is a carbon fiber tow.

13. The method of claim 1, wherein said carbon fiber is in a non-tow form selected from stapled or chopped fiber, yarn, fabric, mesh, or felt.

14. The method of claim 1, wherein said carbon fiber precursor has a composition comprised of polyacrylonitrile and said carbon fiber is produced in a tow form that possesses a minimum tensile strength of at least 600 ksi, a tensile modulus of at least 30 Msi, and an ultimate elongation of at least 1.5%.

15. The method of claim 1, wherein said carbon fiber is subsequently graphitized at a temperature of at least 2,200° C. and up to 3,200° C.

16. The method of claim 15, wherein said graphitization is conducted in the presence of a magnetic field of at least 3 Tesla.

17. The method of claim 1, wherein, prior to said carbonization process, said carbon fiber precursor is subjected to a stabilization process that renders the carbon fiber precursor infusible.

18. The method of claim 17, wherein said stabilization process is conducted in the absence of a magnetic field.

19. The method of claim 17, wherein said stabilization process is conducted in the presence of a magnetic field of at least 3 Tesla.

20. The method of claim 1, wherein said method further comprises subjecting the carbon fiber precursor to microwave and/or plasma processing during the carbonization process.

21. The method of claim 1, wherein the magnetic field is periodically alternating at a frequency of 10 –10,000 Hertz.

22. The method of claim 1, wherein said carbon fiber possesses a specific surface area of 100 –3,000 $m^2$/gram.

23. The method of claim 1, wherein said carbon fiber possesses a thermal conductivity below 10 W/m-K.

24. The method of claim 1, wherein said carbon fiber possesses a thermal conductivity above 100 W/m-K.

25. The method of claim 1, wherein said carbon fiber is in a fused state in a three-dimensional, interconnected mat or felt.

26. The method of claim 1, wherein said magnetic field is at least 5 Tesla.

27. The method of claim 1, wherein said magnetic field is at least 9 Tesla.

\* \* \* \* \*